US012407468B2

(12) United States Patent
Kuo et al.

(10) Patent No.: US 12,407,468 B2
(45) Date of Patent: Sep. 2, 2025

(54) COUPLED DOWNLINK AND UPLINK REFERENCE SIGNALS FOR EFFICIENT MULTI-RTT POSITIONING

(71) Applicant: Nokia Technologies Oy, Espoo (FI)

(72) Inventors: Ping-Heng Kuo, London (GB); Diomidis Michalopoulos, Munich (DE)

(73) Assignee: NOKIA TECHNOLOGIES OY, Espoo (FI)

( * ) Notice: Subject to any disclaimer, the term of this patent is extended or adjusted under 35 U.S.C. 154(b) by 405 days.

(21) Appl. No.: 17/998,385

(22) PCT Filed: May 14, 2020

(86) PCT No.: PCT/EP2020/063455
§ 371 (c)(1),
(2) Date: Nov. 10, 2022

(87) PCT Pub. No.: WO2021/228394
PCT Pub. Date: Nov. 18, 2021

(65) Prior Publication Data
US 2023/0188290 A1 Jun. 15, 2023

(51) Int. Cl.
*H04L 5/00* (2006.01)
*H04W 64/00* (2009.01)
(52) U.S. Cl.
CPC .......... *H04L 5/0051* (2013.01); *H04W 64/00* (2013.01)
(58) Field of Classification Search
CPC .......... H04W 72/1215; H04W 68/005; H04W 64/00; H04L 5/0003; H04L 5/0051
See application file for complete search history.

(56) References Cited

U.S. PATENT DOCUMENTS 12,185,134 B1 * 12/2024 Duong ................. H04W 24/02
2011/0124347 A1 5/2011 Chen et al.
(Continued)

FOREIGN PATENT DOCUMENTS

CN 110447178 A 11/2019
WO 2015/096074 A1 7/2015
(Continued)

OTHER PUBLICATIONS

Office action received for corresponding Chinese Patent Application No. 202080102696.2, dated Nov. 4, 2024, 12 pages of office action and 10 pages of translation available.
(Continued)

*Primary Examiner* — Diane D Mizrahi
(74) *Attorney, Agent, or Firm* — Lippes Mathias LLP

(57) ABSTRACT

According to an aspect, there is provided a terminal device for performing the following. The terminal device maintains, in a memory, configurations of downlink and uplink reference signals. In response to receiving a configuration of a coupling relationship between the downlink and uplink reference signals from an access node, the terminal device stores it to the memory. The terminal device measures, in response to receiving the downlink reference signal from the access node, the downlink reference signal. The terminal device determines whether a radio channel between the terminal device and the access node meets one or more pre-defined criteria. If the one or more pre-defined criteria are not met, the terminal device determines an adjusted transmission mode for the uplink reference signal. If the adjusted transmission mode determines one or more transmission parameters, the terminal device transmits the uplink reference signal to the access node using the adjusted transmission mode.

17 Claims, 8 Drawing Sheets

(56) References Cited

U.S. PATENT DOCUMENTS

| | | |
|---|---|---|
| 2013/0023285 A1 | 1/2013 | Markhovsky et al. |
| 2014/0254412 A1 | 9/2014 | Siomina |
| 2018/0103433 A1 | 4/2018 | Li et al. |
| 2018/0167186 A1 | 6/2018 | Shao et al. |
| 2019/0372639 A1 | 12/2019 | Lo et al. |
| 2020/0112355 A1 | 4/2020 | Park et al. |

FOREIGN PATENT DOCUMENTS

| | | |
|---|---|---|
| WO | 2018/128409 A1 | 7/2018 |
| WO | 2020/072122 A1 | 4/2020 |

OTHER PUBLICATIONS

"Remaining details on aperiodic CSI-RS", 3GPP TSG-RAN WG1 #86bis, R1-1609972, Agenda: 7.2.2.5.1, Qualcomm Incorporated, Oct. 10-14, 2016, pp. 1-4.

Jianwei, "Research of NB-IoT Smart Meters Positioning and Information Security", Chinese instrumentation, Feb. 25, 2020, pp. 21-28.

Office action received for corresponding European Patent Application No. 20726759.2, dated Jan. 31, 2025, 5 pages.

Office action received for corresponding Indian Patent Application No. 202247071661, dated Jul. 3, 2023, 8 pages.

"New SID on NR Positioning Enhancements", 3GPP TSG RAN Meeting #86, RP-193237, Agenda: 9.1.1, Qualcomm Incorporated, Dec. 9-12, 2019, 4 pages.

"Consideration on multi-RTT positioning in NR", 3GPP TSG RAN WG2 Meeting #105bis, R2-1904103, Agenda: 11.8.2, Huawei, Apr. 8-12, 2019, 4 pages.

"Positioning Support for Distributed Network Elements", 3GPP TSG RAN1 #57b, R1-092305, Agenda: 11, LG-Nortel, Jun. 29-Jul. 3, 2009, 3 pages.

"Enhancements to UL power control for Rel-11", 3GPP TSG RAN WG1 Meeting #66, R1-112088, Agenda: 6.7.3, Ericsson, Aug. 22-26, 2011, 4 pages.

"Revised SID Proposal: Coordinated Multi-Point Operation for LTE", 3GPP TSG RAN#/50, RP-101421, Agenda: 11.4, Samsung, Dec. 7-10, 2010, 6 pages.

Invitation to Pay Additional Fees received for corresponding Patent Cooperation Treaty Application No. PCT/EP2020/063455, dated Jan. 21, 2021, 15 pages.

Peral-Rosado et al., "Exploitation of 3D City Maps for Hybrid 5G RTT and GNSS Positioning Simulations", IEEE International Conference on Acoustics, Speech and Signal Processing (ICASSP), May 4-8, 2020, pp. 9205-9209.

"[Offline-612][POS] Summary on spatial relationship configuration", 3GPP TSG-RAN WG2 Meeting #109-e, R2-2001936, Agenda: 6.8.2.1, Huawei, Feb. 24-Mar. 6, 2020, 14 pages.

International Search Report and Written Opinion received for corresponding Patent Cooperation Treaty Application No. PCT/EP2020/063455, dated Mar. 16, 2021, 23 pages.

Office action received for corresponding Chinese Patent Application No. 202080102696.2, dated May 28, 2025, 9 pages of office action and no page of translation available.

\* cited by examiner

COUPLED DOWNLINK AND UPLINK REFERENCE SIGNALS FOR EFFICIENT MULTI-RTT POSITIONING

RELATED APPLICATION

This application was originally filed as PCT Application No. PCT/EP2020/063455, filed on May 14, 2020, is incorporated herein by reference in its entirety.

TECHNICAL FIELD

Various example embodiments relate to wireless communications.

BACKGROUND

Positioning is one of the key enablers for various verticals and use cases that 5G aims to support. By obtaining the knowledge relating to position of the terminal devices, applications such as location-based services, autonomous driving, and industrial Internet of Things (IoT) may be fulfilled by 5G system. Although accurate positioning typically could be fulfilled by Global Navigation Satellite System (GNSS) techniques such as GPS, they may not be able to provide positioning with sufficient accuracy in some indoor scenarios such as factory automation or warehouse management. Thus, Radio Access Technology (RAT)-dependent positioning methods based on measurements of downlink/uplink signals have been considered as potential alternatives.

BRIEF DESCRIPTION

According to an aspect, there is provided the subject matter of the independent claims. Embodiments are defined in the dependent claims.

One or more examples of implementations are set forth in more detail in the accompanying drawings and the description below. Other features will be apparent from the description and drawings, and from the claims.

BRIEF DESCRIPTION OF DRAWINGS

In the following, example embodiments will be described in greater detail with reference to the attached drawings, in which.

DETAILED DESCRIPTION OF SOME EMBODIMENTS

The following embodiments are only presented as examples. Although the specification may refer to "an", "one", or "some" embodiment(s) and/or example(s) in several locations of the text, this does not necessarily mean that each reference is made to the same embodiment(s) or example(s), or that a particular feature only applies to a single embodiment and/or example. Single features of different embodiments and/or examples may also be combined to provide other embodiments and/or examples.

Embodiments and examples described herein may be implemented in any communications system comprising wireless connection(s). In the following, different exemplifying embodiments will be described using, as an example of an access architecture to which the embodiments may be applied, a radio access architecture based on long term evolution advanced (LTE Advanced, LTE-A) or new radio (NR, 5G), without restricting the embodiments to such an architecture, however. It is obvious for a person skilled in the art that the embodiments may also be applied to other kinds of communications networks having suitable means by adjusting parameters and procedures appropriately. Some examples of other options for suitable systems are the universal mobile telecommunications system (UMTS) radio access network (UTRAN or EUTRAN), long term evolution (LTE, substantially the same as E-UTRA), wireless local area network (WLAN or WiFi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS) or any combination thereof.

Figure 1:
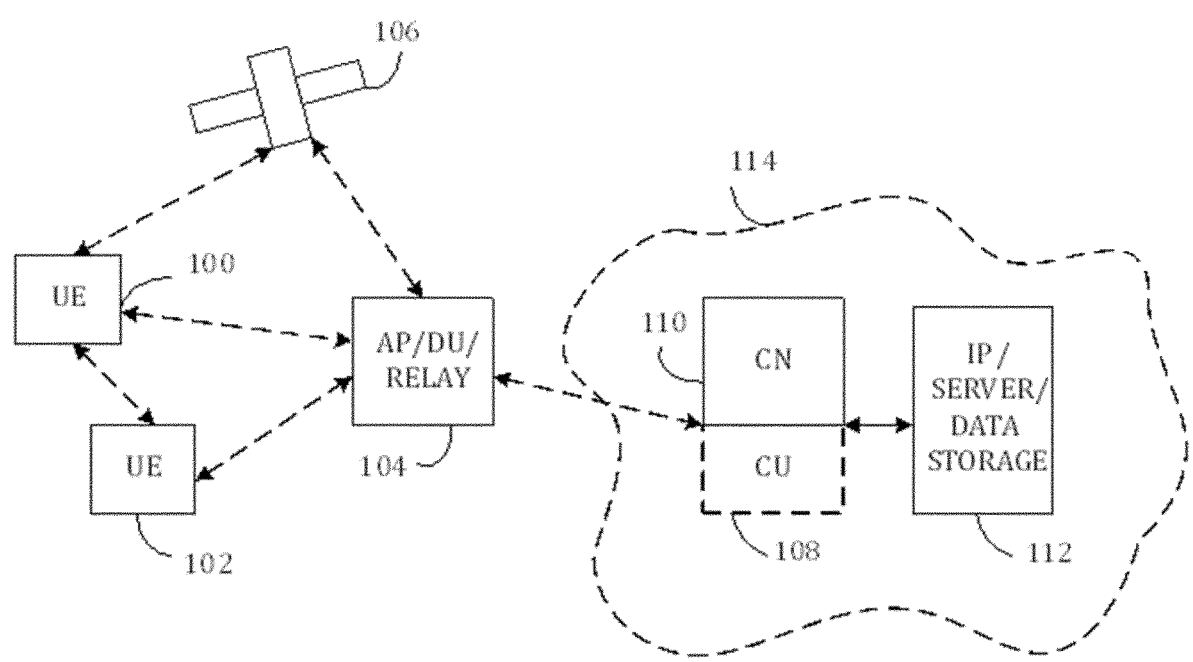
FIG. 1 illustrates an exemplified wireless communication system.

FIG. 1 depicts examples of simplified system architectures showing some elements and functional entities, some or all being logical units, whose implementation may differ from what is shown. The connections shown in FIG. 1 are logical connections; the actual physical connections may be different. It is apparent to a person skilled in the art that the system typically comprises also other functions and structures than those shown in FIG. 1.

The embodiments are not, however, restricted to the system given as an example but a person skilled in the art may apply the solution to other communication systems provided with necessary properties.

The example of FIG. 1 shows a part of an exemplifying radio access network.

FIG. 1 shows user devices 100 and 102 configured to be in a wireless connection on one or more communication channels in a cell with an access node (such as (e/g) NodeB) 104 providing the cell. The physical link from a user device to a (e/g) NodeB is called uplink or reverse link and the physical link from the (e/g) NodeB to the user device is called downlink or forward link. It should be appreciated that (e/g) NodeBs or their functionalities may be implemented by using any node, host, server or access point etc. entity suitable for such a usage.

A communications system typically comprises more than one (e/g) NodeB in which case the (e/g) NodeBs may also be configured to communicate with one another over links, wired or wireless, designed for the purpose. These links may be used for signalling purposes. The (e/g) NodeB is a computing device configured to control the radio resources of communication system it is coupled to. The NodeB may also be referred to as a base station, an access point or any other type of interfacing device including a relay station capable of operating in a wireless environment. The (e/g) NodeB includes or is coupled to transceivers. From the transceivers of the (e/g) NodeB, a connection is provided to an antenna unit that establishes bi-directional radio links to user devices. The antenna unit may comprise a plurality of antennas or antenna elements. The (e/g) NodeB is further connected to core network 110 (CN or next generation core NGC). Depending on the system, the counterpart on the CN side can be a serving gateway (S-GW, routing and forwarding user data packets), packet data network gateway (P-GW), for providing connectivity of user devices (UEs) to external packet data networks, or mobile management entity (MME), etc. The core network 110 may comprise a Location Management Function (LMF) and/or some other network node for performing position estimation of terminal devices.

The user device (also called UE, user equipment, user terminal, terminal device, etc.) illustrates one type of an apparatus to which resources on the air interface are allocated and assigned, and thus any feature described herein with a user device may be implemented with a corresponding apparatus, such as a relay node. An example of such a relay node is a layer 3 relay (self-backhauling relay) towards the base station.

The user device typically refers to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a user device may also be a nearly exclusive uplink device, of which an example is a camera or video camera loading images or video clips to a network. A user device may also be a device having capability to operate in Internet of Things (IoT) network which is a scenario in which objects are provided with the ability to transfer data over a network without needing human-to-human or human-to-computer interaction. The user device (or in some embodiments a layer 3 relay node) is configured to perform one or more of user equipment functionalities. The user device may also be called a subscriber unit, mobile station, remote terminal, access terminal, user terminal or user equipment (UE) just to mention but a few names or apparatuses.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

It should be understood that, in FIG. 1, user devices are depicted to include 2 antennas for the sake of clarity. The number of reception and/or transmission antennas may naturally vary according to a current implementation.

Additionally, although the apparatuses have been depicted as single entities, different units, processors and/or memory units (not all shown in FIG. 1) may be implemented.

5G enables using multiple input-multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications, including vehicular safety, different sensors and real-time control. 5G is expected to have multiple radio interfaces, namely below 6 GHz, cmWave and mmWave, and also being integradable with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and interRI operability (inter-radio interface operability, such as below 6 GHz-cmWave, below 6 GHz-cmWave-mmWave). One of the concepts considered to be used in 5G networks is network slicing in which multiple independent and dedicated virtual sub-networks (network instances) may be created within the substantially same infrastructure to run services that have different needs on latency, reliability, throughput and mobility.

The current architecture in LTE networks is fully distributed in the radio and fully centralized in the core network. The low latency applications and services in 5G need to bring the content close to the radio which leads to local break out and multiaccess edge computing (MEC). 5G enables analytics and knowledge generation to occur at the source of the data. This approach needs leveraging resources that may not be continuously connected to a network such as laptops, smartphones, tablets and sensors. MEC provides a distributed computing environment for application and service 15 hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic selfhealing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks, such as a public switched telephone network or the Internet 112, or utilise services provided by them. The communication network may also be able to support the usage of cloud services, for example at least part of core network operations may be carried out as a cloud service (this is depicted in FIG. 1 by "cloud" 114). The communication system may also comprise a central control entity, or a like, providing facilities for networks of different operators to cooperate for example in spectrum sharing.

Edge cloud may be brought into radio access network (RAN) by utilizing network function virtualization (NVF) and software defined networking (SDN). Using edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloudRAN architecture enables RAN real time functions being carried out at the RAN side (in a distributed unit, DU 104) and non-real time functions being carried out in a centralized manner (in a centralized unit, CU 108).

It should also be understood that the distribution of labour between core network operations and base station operations may differ from that of the LTE or even be non-existent. Some other technology advancements probably to be used are Big Data and all-IP, which may change the way networks are being constructed and managed. 5G (or new radio, NR) networks are being designed to support multiple hierarchies, where MEC servers can be placed between the core and the base station or nodeB (gNB). It should be appreciated that MEC can be applied in 4G networks as well.

5G may also utilize satellite communication to enhance or complement the coverage of 5G service, for example by providing backhauling. Possible use cases are providing service continuity for machine-to-machine (M2M) or Internet of Things (IoT) devices or for passengers on board of vehicles, or ensuring service availability for critical communications, and future railway/maritime/aeronautical communications. Satellite communication may utilise geostationary earth orbit (GEO) satellite systems, but also low earth orbit (LEO) satellite systems, in particular megaconstellations (systems in which hundreds of (nano) satellites are deployed). At least one satellite 106 in the mega-constellation may cover several satellite-enabled network entities that create on-ground cells. The on-ground cells may be created through an on-ground relay node 104 or by a gNB located on-ground or in a satellite.

It is obvious for a person skilled in the art that the depicted system is only an example of a part of a radio access system and in practice, the system may comprise a plurality of (e/g) NodeBs, the user device may have an access to a plurality of radio cells and the system may comprise also other apparatuses, such as physical layer relay nodes or other network elements, etc. At least one of the (e/g) NodeBs or may be a Home (e/g) nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto-or picocells. The (e/g) NodeBs of FIG. 1 may provide any kind of these cells. A cellular radio system may be implemented as a multilayer network including several kinds of cells. Typically, in multilayer networks, one access node provides one kind of a cell or cells, and thus a plurality of (e/g) NodeBs are needed to provide such a network structure.

For fulfilling the need for improving the deployment and performance of communication systems, the concept of "plug-and-play" (e/g) NodeBs has been introduced. Typically, a network which is able to use "plug-and-play" (e/g) Node Bs, includes, in addition to Home (e/g) NodeBs (H (e/g) nodeBs), a home node B gateway, or HNB-GW (not shown in FIG. 1). A HNB Gateway (HNB-GW), which is typically installed within an operator's network may aggregate traffic from a large number of HNBs back to a core network.

In the following, an access node (e.g., a gNB) as discussed in relation to embodiments may form a part of a larger device such as a satellite or a base station.

Positioning is one of the key enablers for various verticals and use cases that 5G aims to support. By obtaining the knowledge relating to position of the terminal devices, applications such as location-based services, autonomous driving, and industrial Internet of Things (IoT) may be fulfilled by 5G system. Although accurate positioning typically could be fulfilled by Global Navigation Satellite System (GNSS) techniques such as GPS, they may not be able to provide positioning with sufficient accuracy in some indoor scenarios such as factory automation or warehouse management. Thus, Radio Access Technology (RAT)-dependent positioning methods based on measurements of downlink/uplink signals have been considered as potential alternatives.

One suggested RAT-dependent positioning approach is the multi-RTT (Round Trip Time) method. The multi-RTT method has been used for estimating a distance between an access node and a terminal device based on Positioning Reference Signal (PRS) and Sounding Reference Signal (SRS) measurements, respectively, and for reporting the receiver-transmitter (Rx-Tx) time difference (known as Reference Signal Time Difference, RSTD) to the Location Management Function (LMF) of the core network. The LMF is able to evaluate the RTT and hence the distance between the access node and the terminal device based on the reported PRS and SRS measurements. By measuring the distance between the terminal device and a plurality of access nodes in this way, the location of the terminal device may be calculated as the locations of the access nodes are (generally) known.

More specifically, the general procedure for multi-RTT positioning may comprise, for example, all or at least some of the following steps:

The LMF sends the PRS configuration information to the terminal device, indicating to the terminal device the DL PRS configuration associated with different access nodes. The LMF also indicates to the terminal device the UL PRS information, on which it transmits the UL PRS for the access nodes to measure.

The access nodes transmit DL PRS and terminal devices transmit UL PRS.

The terminal devices measure time of arrival (TOA) and access nodes measure TOA.

The terminal device transmits a measurement report to the LMF, including the measured UE Rx-Tx time difference for at least one access node; The access node transmits a measurement report to the LMF, including the gNB Rx-Tx time difference measurement.

The LMF calculates RTT per at least one access node based on the measurement reports received from at least one access node and the terminal device and further, based on the RTT, the location of the terminal device.

The multi-RTT method serves as an alternative to timing-based methods (such as observed time difference of arrival, OTDOA). The multi-RTT method has the benefit of not being sensitive to accurate synchronization between the transmission points/access nodes like, e.g., OTDOA. In particular, with multi-RTT method, the need for synchronized transmission points is alleviated, since it is not the time of arrival (or relative time of arrival) that determines the position of the terminal device, but the round-trip time between at least one transmission point and the terminal device.

Based on the multi-RTT method, the distance may be accurately calculated if the RSTD was observed on a Line-of-Sight (LOS) path. Conversely, when there is no LoS path available between access node and terminal device (due to rich scattering or blockage in the propagation environment), the measured RSTD could result in biased position estimation that leads to accuracy degradation. Furthermore, the integrity (the level of trustworthiness of the position estimation) may be violated due to the measurement being made without a LoS path.

Moreover, compared to conventional timing-based positioning methods (e.g., uplink or downlink time difference of arrival), one shortcoming of the conventional multi-RTT method is the need for both downlink and uplink reference signals (i.e., both PRS and SRS have to be configured and transmitted), which is less efficient in terms of both network and device efficiency. In particular, such resource usage can be totally wasted when a LoS path is not available, as the measurements obtained from these reference signals do not provide useful information for position estimation. Clearly, efficiency of multi-RTT method depends heavily on the propagation environment.

The embodiments to be discussed below seek to improve resource efficiency of the conventional multi-RTT method while ensuring the obtained measurements are useful for achieving sufficient positioning accuracy, as well as integrity.

Figure 2:
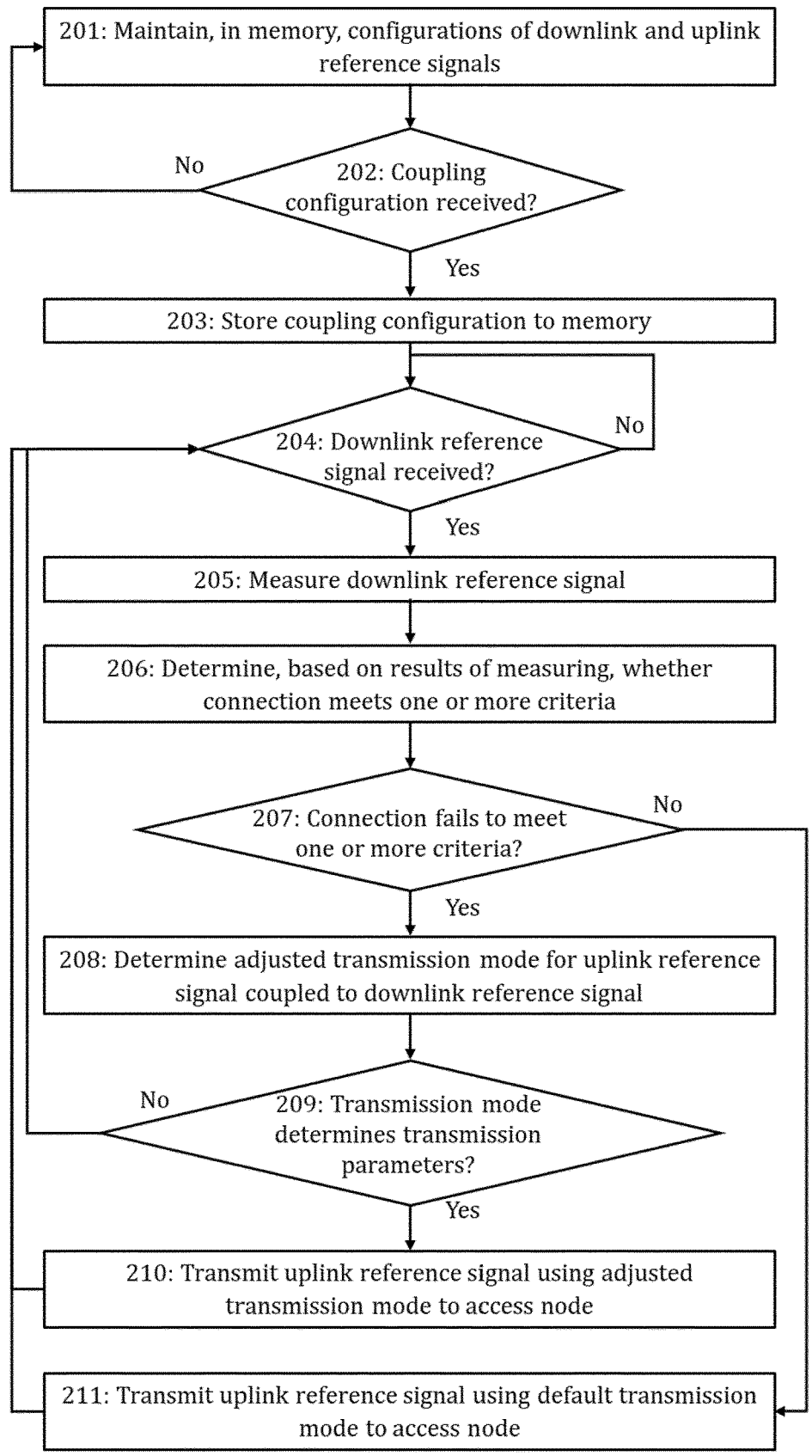
FIGS. 2 to 7 illustrate exemplary processes according to embodiments.

FIG. 2 illustrates a process according to an embodiment for implementing a coupling relationship between a downlink and uplink reference signals for a terminal device and performing reception/transmission according to said coupling relationship. The illustrated process may form a part of an advanced multi-RTT method for position estimation. The illustrated process may be performed by a terminal device or specifically by either of terminal devices 100, 102 of FIG. 1.

Referring to FIG. 2, it may be initially assumed that the terminal device maintains, in block 201, in a memory of the terminal device, a configuration of a downlink reference signal and a configuration of an uplink reference signal. The configurations of the downlink and uplink reference signals may be specific to the terminal device and a particular access node (later "the access node"). The configurations of the downlink and uplink reference signals may define the radio resource allocation for downlink and uplink reference signals. The configuration of the downlink reference signal may comprise, for example, information on time resources (e.g., time slots), frequency resources (e.g., frequency blocks), code resources (e.g. code sequences) and/or spatial resources (e.g. beams) to be used for the transmission and reception of the downlink reference signal. In general, the configuration of the downlink reference signal may also comprise, for example, one or more transmission parameters to be employed for the transmission of the downlink reference signal or a (default) transmission mode defining (or determining) said one or more transmission parameters. Correspondingly, the configuration of the uplink reference signal may comprise, for example, information on time resources (e.g., time slots), frequency resources (e.g., frequency blocks), code resources (e.g. code sequences) and/or spatial resources (e.g. beams) to be used for the transmission and reception of the uplink reference signal. Moreover, the configuration of the downlink reference signal may also comprise, for example, one or more transmission parameters to be employed for the transmission of the uplink reference signal or a (default) transmission mode defining (or determining) said one or more transmission parameters. The configurations of the downlink reference signal and/or the uplink reference signal may also comprise information on periodicity of the transmission of the corresponding reference signal (i.e., how often it is transmitted/received). The downlink reference signal may be specifically a positioning reference signal (PRS) and the uplink reference signal may be specifically a sounding reference signal (SRS). The configurations of the downlink and uplink reference signals may have been received previously from the access node (as depicted, e.g., in elements 401, 402 of FIG. 4). The access node may have received said configurations from the LMF.

The terminal device receives, in block 202, a configuration of a coupling relationship between the downlink reference signal and the uplink reference signal from the access node. Said configuration of the coupling relationship may define how the terminal device should perform transmitting of the uplink reference signal taking into account the downlink reference signal received earlier (as will be discussed in detail in the following). The configuration of the coupling relationship may define a pairing of indices of the downlink reference signal and the uplink reference signals. In general, the terminal device may be configured to use a plurality of downlink reference signals and a plurality of uplink reference signals, at least one reference signal being assigned an index. For example, when configuring a configuration index i of downlink reference signals, the configuration of the coupling relationship may indicate that this particular downlink reference signal with index i is coupled to a configuration index j of uplink reference signals. The transmitted configuration of the coupling relationship (or at least the configuration of the coupling relationship) may originate from the access node or the LMF. The terminal device stores, in block 203, the configuration of the coupling relationship to a memory of the terminal device.

In response receiving the downlink reference signal from the access node according to the configuration of the downlink reference signal according to the configuration of the downlink reference signal in block 204, the terminal device measures, in block 205, the downlink reference signal. The measuring in block 205 may correspond to estimating the downlink channel quality over certain radio resources (e.g., over certain time and/or frequency resources). The measuring in block 205 may comprise, for example, measuring one or more of time of arrival (TOA), RSTD, power or signal strength of the downlink reference signal, a signal-to-noise ratio (SNR) of the downlink reference signal, a signal-to-interference-plus-noise ratio (SINR) of the downlink reference signal. Any of the listed quantities may be measured over certain radio resources.

Based on results of the measuring (in block 205), the terminal device determines, in block 206, whether a radio channel (or specifically a radio propagation channel) between the terminal device and the access node meets one or more pre-defined criteria. Specifically, the one or more pre-defined criteria may define one or more criteria for a line-of-sight (LoS) path (or equally a LoS link or a LoS connection) existing in the radio channel between the terminal device and the access node. In other words, the terminal device may check, in block 206, whether a LOS path exists between the terminal device and the access node based on results of the measuring. Said one or more pre-defined criteria may comprise, for example, one or more thresholds for received power or signal strength of the downlink reference signal, a signal-to-noise ratio (SNR) of the downlink reference signal and/or a signal-to-interference-plus-noise ratio (SINR) of the downlink reference signal. The one or more pre-defined criteria may be defined, e.g., in the configuration of the coupling relationship or they may have been configured to the terminal device separately.

If the radio channel between the terminal device and the access node is observed to be unfavorable for positioning (e.g., missing a LOS path) in the downlink, it is expected that the radio channel is of equally unfavorable for positioning in the uplink due to channel reciprocity. Thus, transmission of the uplink reference signal may not be necessary as the measurement results derived from the uplink reference signal are, in any case, not suitable for a Location Management Function (LMF) to calculate the RTT accurately due to its inappropriateness for positioning (e.g., caused by absence of LoS path). Consequently, in response to determining that the radio channel fails to meet the one or more pre-defined criteria in block 207, terminal device determines, in block 208, an adjusted transmission mode for the uplink reference signal coupled to the downlink reference signal based on the configuration of the coupling relationship. The adjusted transmission may serve to minimize (or reduce) power consumption of the terminal device.

By minimizing the power consumption of the terminal device for transmitting the reference signal, the power transmitted by the terminal device is also minimized which, in turn, leads to a minimization of interference caused by said transmission of the uplink reference signal. The adjusted transmission mode may define (or determine) one or more transmission parameters to be used for transmitting the uplink reference signal. Specifically, said one or more transmission parameters may be defined so as to minimize (or reduce) power consumption (or equally transmit power or interference). Alternatively, the adjusted transmission mode may define a cancellation the transmission of the uplink reference signal. In other words, the adjusted transmission mode (or use thereof) may result in the cancellation of the transmission of the uplink reference signal. The configuration of the coupling relationship defines, in connection with block 208, at least the coupling relationship between the downlink reference signal and the uplink reference signal (i.e., it defines which uplink reference signal should be targeted in block 208) though it may also explicitly define the adjusted transmission mode for said uplink reference signal. In other embodiments, the adjusted transmission mode for the uplink reference signal may be configured separately.

Said one or more transmission parameters to be used for transmitting the downlink reference signal may comprise, for example, transmission power and/or one or more listen-before-talk (LBT) parameters (if unlicensed spectrum is employed). For example, the adjusted transmission mode may define that a lowered level for the transmission power is to be used for transmitting the uplink reference signal so that it is unlikely that the transmission causes interference to other devices. LBT is a technique where a transmitter, first, senses its radio environment before starting a transmission. Said one or more LBT parameters may be adjusted, for example, by adjusting the Channel Access Priority Class (CAPC) of the transmission. The CAPC maps to a set of LBT parameters for transmission in an unlicensed band, such as contention window size.

If the (determined) transmission mode defines (or determines) said one or more transmission parameters in block 209 (as opposed to defining that no transmission is to be carried out), the terminal device transmits, in block 210, the uplink reference signal to the access node using said adjusted transmission mode (and using the configuration of the uplink reference signal). While the access node may receive and measure the transmitted uplink reference signal, it is assumed that it is not usable for performing position estimation (e.g., using a multi-RTT method).

If the (determined) transmission mode does not define (or determine) said one or more transmission parameters but instead defines (or determines) that the transmission of the uplink reference signal is to be cancelled (or dropped) in block 209, no further actions may be carried out by the terminal device in regards to the transmission of the uplink reference signal.

If the radio channel between the terminal device and the access node meets the one or more pre-defined criteria in block 207 (e.g., a LoS path exists), the terminal device transmits, in block 211, the uplink reference signal to the access node using a default transmission mode defined, e.g., in the configuration of the uplink reference signal. The transmission of the uplink reference signal with the default transmission mode may be associated with a (considerably) higher power consumption of the terminal device (and consequently also higher transmit power) compared to the transmission of the uplink reference signal with the adjusted transmission mode. The default transmission mode may define (or determine) one or more default transmission parameters for transmitting the uplink reference signal.

Following conventional multi-RTT methodology, the terminal device may transmit a measurement report to a Location Management Function of a core network for performing position estimation according to the multi-RTT method (e.g., via said access node or via another access node). The measurement report is based on the results of the measuring (i.e., the measuring in block 205). The measurement report may comprise at least a measured Rx-Tx time difference (RSTD) between the terminal device and the access node. The access node may transmit, in a corresponding manner, at least one measurement report to the LMF, where said at least one measurement report may comprise a measured Rx-Tx time difference between the access node and at least said terminal device (preferably, a plurality of terminal devices for which the process of FIG. 2 has been carried out). The LMF may carry out the rest of the multi-RTT process for obtaining the RTT for at least one access node (preferably, a plurality of access nodes) and, based on the RTT, calculating the location of the terminal device in a conventional manner.

In some embodiments, the terminal device may transmit a measurement report to a network node (other than the LMF) for performing position estimation (e.g., using the multi-RTT method).

While the process of FIG. 2 was discussed above assuming a single downlink reference signal and a single uplink reference signal, in some more general embodiments, the terminal device may maintain, in block 201, in the memory, configurations of at least one downlink reference signal and at least one uplink reference signal. Correspondingly, the terminal device may receive, in block 202, at least one configuration of a coupling relationship between at least one downlink reference and at least one uplink reference signal.

Figure 3:
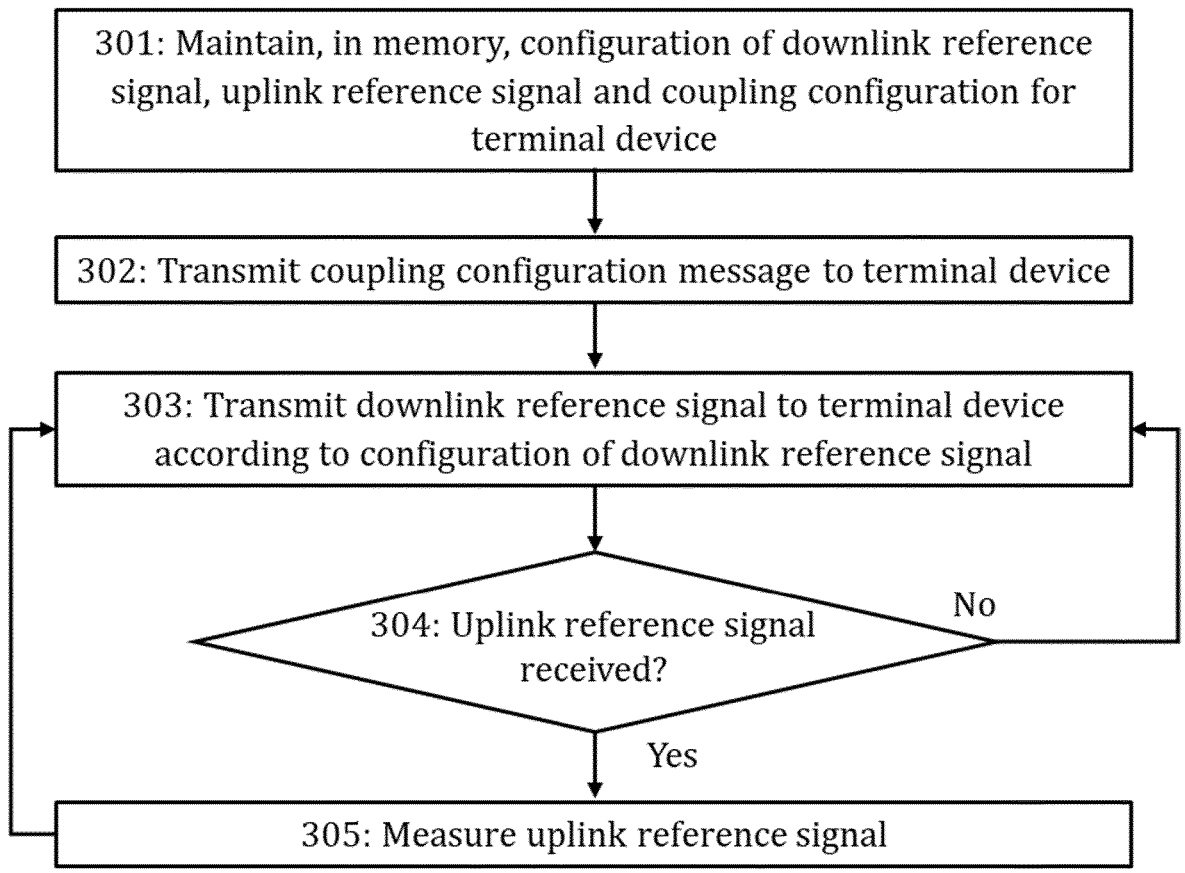

FIG. 3 illustrates a process according to embodiments for configuring a coupling relationship between downlink and uplink reference signals for a terminal device and performing reference signal measurements according to said coupling relationship. The illustrated process may be performed by an access node or specifically by an access node 104 of FIG. 1. The illustrated process may correspond to the process carried out by an access node while an associated terminal device carries out the process described in relation to FIG. 2. Thus, any definitions provided in relation to FIG. 2 apply as such also for the embodiments discussed in relation to FIG. 3.

Referring to FIG. 3, it is assumed initially that the access node maintains, in block 301, in a memory of the access node, a configuration of a downlink reference signal (e.g., a PRS) for a terminal device, a configuration of an uplink reference signal (e.g., SRS) for the terminal device and a configuration of coupling relationship between the downlink reference signal and the uplink reference signal. Further, it is assumed here (similar to the process of FIG. 2) that the terminal device has already been configured to use said configuration of the downlink and uplink reference signals (e.g., by the access node). Said configurations may be defined as discussed in relation to FIG. 3. Said configurations may have been received previously from the LMF or from other (core) network node.

The access node transmits, in block 302, to the terminal device, a configuration of the coupling relationship between the downlink reference signal and the uplink reference signal configured to the terminal device. The configuration of the coupling relationship may define the one or more pre-defined criteria and/or the adjusted transmission mode, as discussed above. Thereafter, the access node transmits, in block 303, the downlink reference signal to the terminal device according to the configuration of the downlink reference signal for the terminal device. Upon receiving (and measuring) the downlink reference signal according to the configuration of the downlink reference signal, the terminal device may or may not transmit an uplink reference signal depending on the characteristics of the radio channel between the access node and the terminal device. If the uplink reference signal is received, in block 304, from the terminal device, the access node measures, in block 305, said uplink reference signal.

Similar to conventional in multi-RTT methodology, the access node may transmit a measurement report to a Location Management Function (LMF) of a core network for performing position estimation according to the multi-RTT method. The measurement report is based on results of the measuring (i.e., the measuring in block 305). In some other embodiments, the measurement report may be transmitted to a network node other than the LMF.

Figure 4:
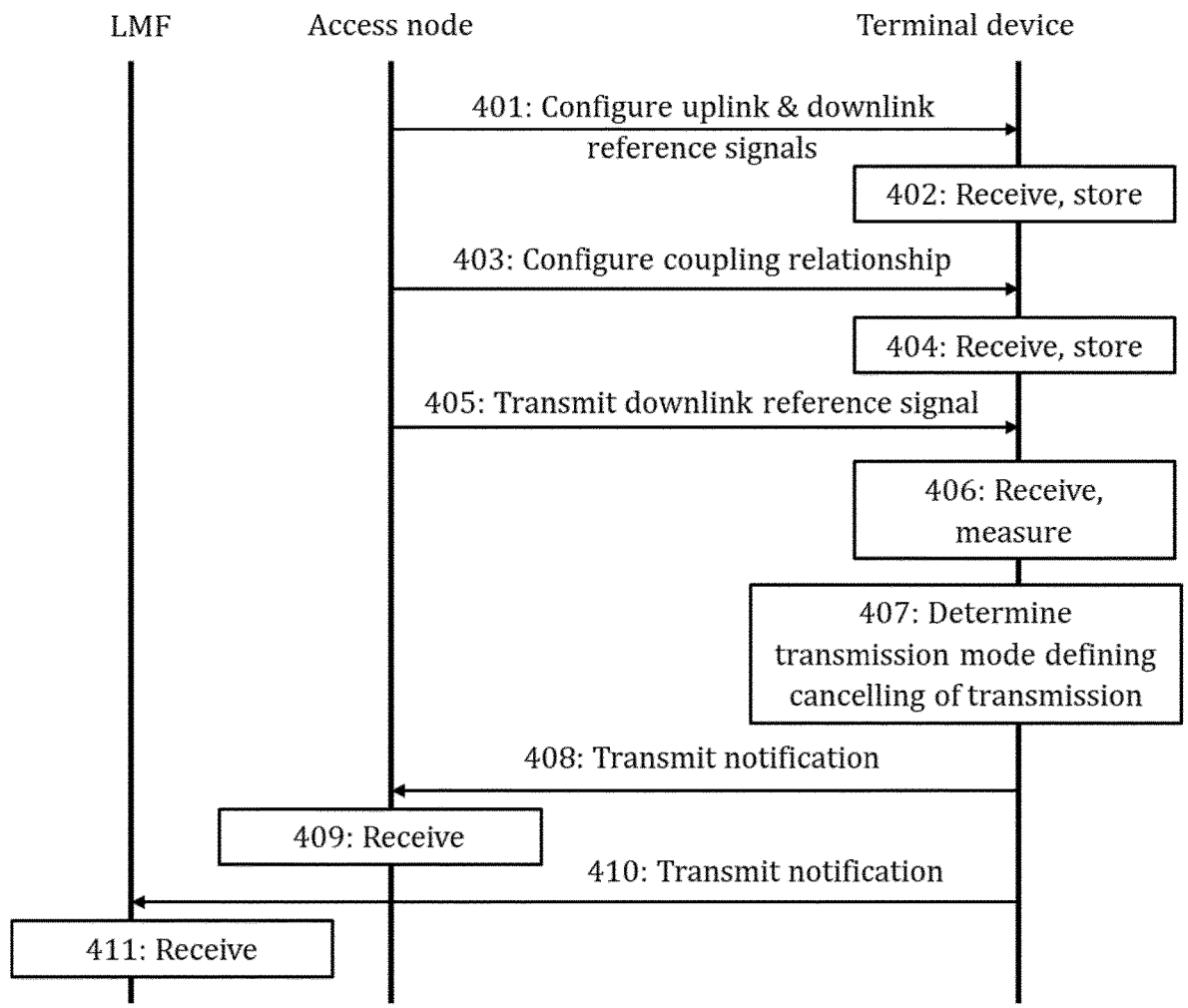

FIG. 4 illustrates signaling between a LMF, an access node and a terminal device according an alternative embodiment for implementing a coupling relationship between a downlink and uplink reference signals for a terminal device and performing reception/transmission according to said coupling relationship. The illustrated process may form a part of an advanced multi-RTT method for position estimation. The terminal device in FIG. 4 may correspond to either of terminal devices 100, 102 of FIG. 1, the access node in FIG. 4 may correspond to the access node 104 of FIG. 1 and/or the LMF in FIG. 4 may correspond (or be comprised) in the core network element 110 of FIG. 1.

In FIG. 4, downlink and uplink reference signals are, first, configured to the terminal device by transmitting, in message 401, from the access node to the terminal device, at least one configuration message defining the configuration of the downlink reference signal for the terminal device and the configuration of the uplink reference signal for the terminal device. The configurations may originate from the LMF (not shown in FIG. 4). Upon receiving said at least one configuration message in block 402, the terminal device stores, in block 402, the configurations to a memory of the terminal device. The feature of elements 401, 402 may be combined also with embodiments discussed in relation to FIGS. 2 and 3.

The processes illustrated with elements 403 to 407 may correspond to functionalities described in relation to blocks 201 to 207 of FIG. 2 and blocks 302, 303 of FIG. 3. In FIG. 4, it is assumed that results of the measurements of the downlink reference signal fail to meet the one or more pre-defined criteria and the adjusted transmission mode (defined, e.g., in the configuration of the coupling relationship) corresponds to cancelling the transmission of the uplink reference signal. Thus, no uplink transmission is carried out in FIG. 4 for transmitting the uplink reference signal.

However, two additional messaging functionalities are illustrated in FIG. 4 following the decision to drop the transmission of the uplink reference signal. Firstly, in response to determining the adjusted transmission mode in block 407, the terminal device transmits, in message 408, a first notification regarding the adjusted transmission mode (i.e., in this example, corresponding to cancelling of transmission of the uplink reference signal) to the access node. The access node receives, in block 409, said first notification from the terminal device. Based on the first notification, the access node may refrain from receiving the uplink reference signal and thus the uplink resources reserved for said uplink reference signal may be used for other purposes. The first notification may be transmitted, for example, as an uplink medium access control element (UL MAC CE) or as uplink control information (UCI). In some embodiments, the first notification may comprise explicit instructions for the access node to refrain from receiving the uplink reference signal while, in others, the access node may be configured to refrain from receiving an uplink reference signal automatically in response to receiving any notification regarding the adjusted transmission mode.

Secondly, in response to determining an adjusted transmission mode in block 407, the terminal device transmits, in message 410, a second notification regarding the adjusted transmission mode to the LMF of a core network (e.g., via the access node). The LMF receives, in block 411, the second notification from the terminal device. Based on the second notification, the LMF may discard the corresponding measurement report (and thus, e.g., not use it for the multi-RTT method). In some embodiments, the second notification may comprise explicit instructions for the access node to discard the corresponding measurement report while, in others, the LMF may be configured to perform such discarding automatically in response to receiving any notification regarding the adjusted transmission mode. In some embodiments, a corresponding notification regarding a transmission mode (here, specifically the default transmission mode) may be transmitted also in response to determining that the one or more pre-defined criteria are met and thus the default transmission mode is to be used for transmission.

One or both of messages 408, 410 may be transmitted irrespective of the definition of the adjusted transmission mode. In other words, while FIG. 4 illustrates, as an example, the case where the adjusted transmission mode corresponds to cancelling the transmission, the first and/or second notifications may be transmitted also if the transmission mode defines (or determines) one or more transmission parameters to be used for transmission of the uplink reference signal (for minimizing power consumption or transmit power or interference), in some embodiments.

In other embodiments, the explicit indication in message 410 may be omitted and the LMF may infer the information carried by message 410 based on the values comprised in the measurement reports transmitted to the LMF. For instance, if a transmission is dropped (or if it is carried out with lowered transmission power), the received signal power should be below a certain (rather low) threshold, which could be inferred by the LMF as transmission dropping.

The relative order of messages 408, 410 may be opposite in other embodiments. In some embodiments, one of messages 408, 410 may be transmitted. For example, the message 410 may be transmitted so that the access node may still go ahead and perform measurements of the uplink reference signal, but the LMF will simply discard said measurements when they are reported to it by the access node (e.g., due to the lower than expected power level for LoS measurements).

In some more general embodiments, the terminal device may transmit, in response to the determining of the adjusted transmission mode, a notification regarding the adjusted transmission mode to at least one network node (e.g., the LMF and/or the access node).

Figure 5:
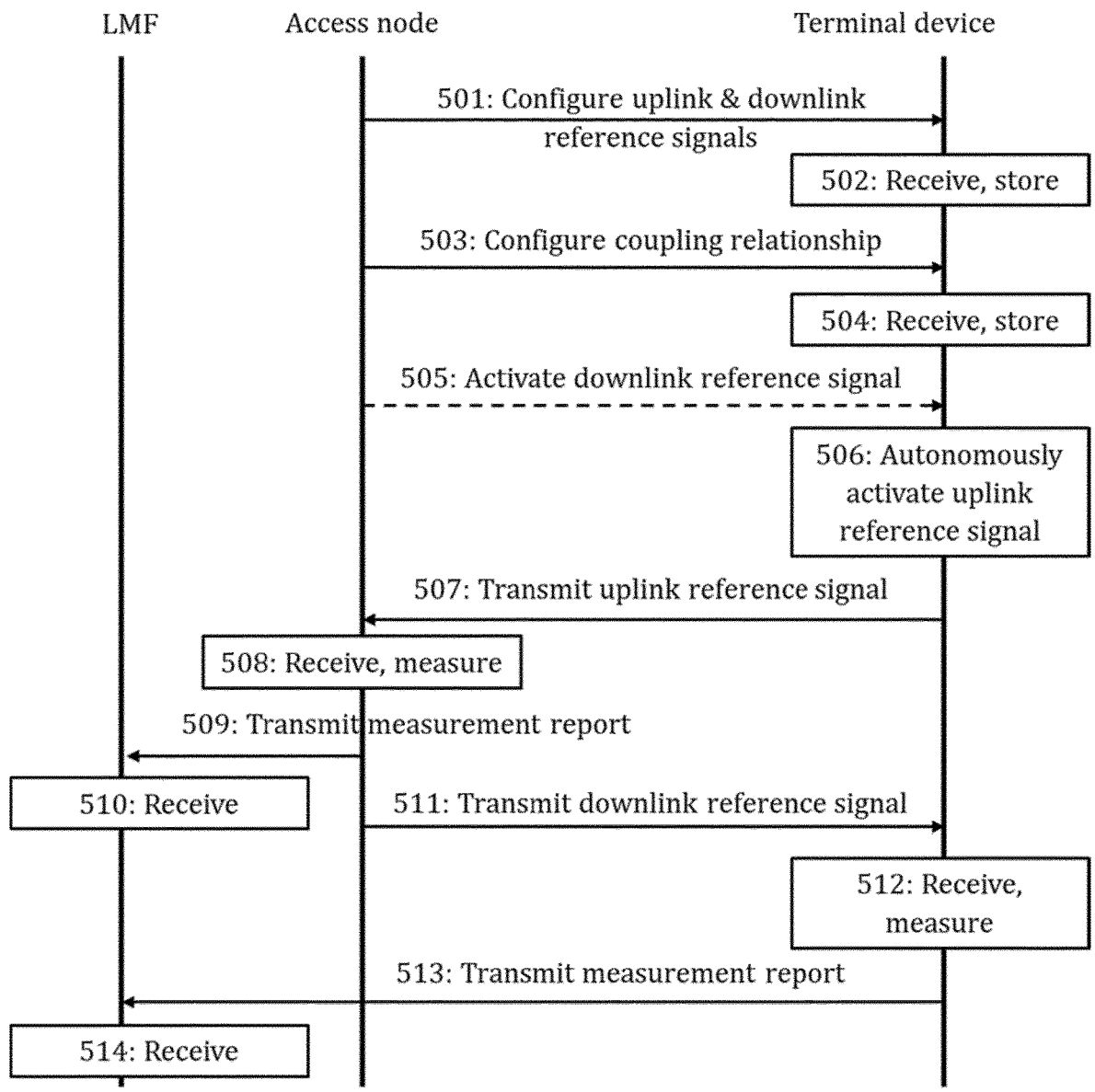

FIG. 5 illustrates signaling between a LMF, an access node and a terminal device according an alternative embodiment for implementing a coupling relationship between a downlink and uplink reference signals for a terminal device and performing reception/transmission according to said coupling relationship. The illustrated process may form a part of an advanced multi-RTT method for position estimation. The terminal device in FIG. 5 may correspond to either of terminal devices 100, 102 of FIG. 1, the access node in FIG. 5 may correspond to the access node 104 of FIG. 1 and/or the LMF in FIG. 5 may correspond (or be comprised) in the core network element 110 of FIG. 1.

FIG. 5 corresponds, for the most part, to FIG. 4 discussed above. Namely, elements 501 to 504, 511, 512 may correspond to elements 401 to 406 of FIG. 4, respectively and are thus not discussed here in detail. The processes illustrated in FIG. 5 differ from the embodiments discussed in relation to FIG. 4 in that the coupling relationship between the downlink and uplink reference signals configured to the terminal device is used, in this case, directly for the activation of an uplink reference signal, as opposed to the uplink reference signal being activated, e.g., based on the reception/measurement of the downlink reference signal. In fact, the measurement of the downlink reference signal is not essential for carrying out the coupling functionality according to this alternative embodiment (though said measurement is needed for preparing and transmitting a measurement report to meet the needs of a multi-RTT method).

In FIG. 5, it is assumed that the terminal device is configured (in elements 501, 502) to receive a downlink reference signal. Based on the configuration of the coupling relationship between the downlink reference signal and the uplink reference signal, the terminal device (autonomously) activates, in block 506, the uplink reference signal coupled to the downlink reference signal in response to an activation of the downlink reference signal. The downlink reference signal may be activated, in the terminal device, by the terminal device receiving a message 505 (or an activation message) transmitted by the access node. Alternatively, the downlink reference signal may be activated, in the terminal device, according to the configuration of the downlink reference signal (that is, the activation of the downlink reference signal may be defined therein). It should be emphasized that the message 505 illustrated with a dashed line is, thus, optional.

As a result of the activation of the uplink reference signal, the terminal device transmits, in message 507, an uplink reference signal to the access node according to the configuration of the uplink reference signal. This embodiment reduces signaling overhead that is needed for activating reference signals in both downlink and uplink different directions.

FIG. 5 also explicitly illustrates the aforementioned feature of the terminal device and the access node, upon receiving and measuring uplink and downlink reference signals in block 508, 512, transmitting, in messages 509, 513, measurement reports to the LMF in a core network for performing position estimation according to a multi-RTT method, respectively. The measurement reports 509, 513 are based on the results of the measuring in blocks 508, 512, respectively. The LMF receives, in blocks 510, 514, the measurement reports from the access node and the terminal device, respectively. This feature may be combined with any other embodiment discussed above or to be discussed below.

It should be noted that in other embodiments, the order in time of actions relating to elements 506 to 514 may be different and/or some of said actions may be carried out substantially in parallel with each other. For example, the downlink reference signal 511 may be transmitted before the uplink reference signal 507 in some cases.

While in the process of FIG. 5 discussed above, an activation of a downlink reference signal activated simultaneously also an uplink reference signal coupled to the activated downlink reference signal, in other embodiments, an inverse relationship may hold. In other words, an activation of an uplink reference signal may activate simultaneously also a downlink reference signal coupled to the activated uplink reference signal.

In the embodiments discussed above in relation to FIGS. 2 to 4, it was assumed that the coupling relationship between the downlink and uplink reference signals was configured to the terminal device so that initially a downlink reference signal is transmitted by the access node to the terminal device and subsequently an uplink reference signal is transmitted by the terminal device based on the received and measured downlink reference signal and the configuration of the coupling relationship. In some embodiments, this order may, however, be reversed so that the coupling relationship between the downlink and uplink reference signals is configured to the access node and it is the terminal device which initiates the transmitting of reference signals, as will described in detail in the following.

Figure 6:
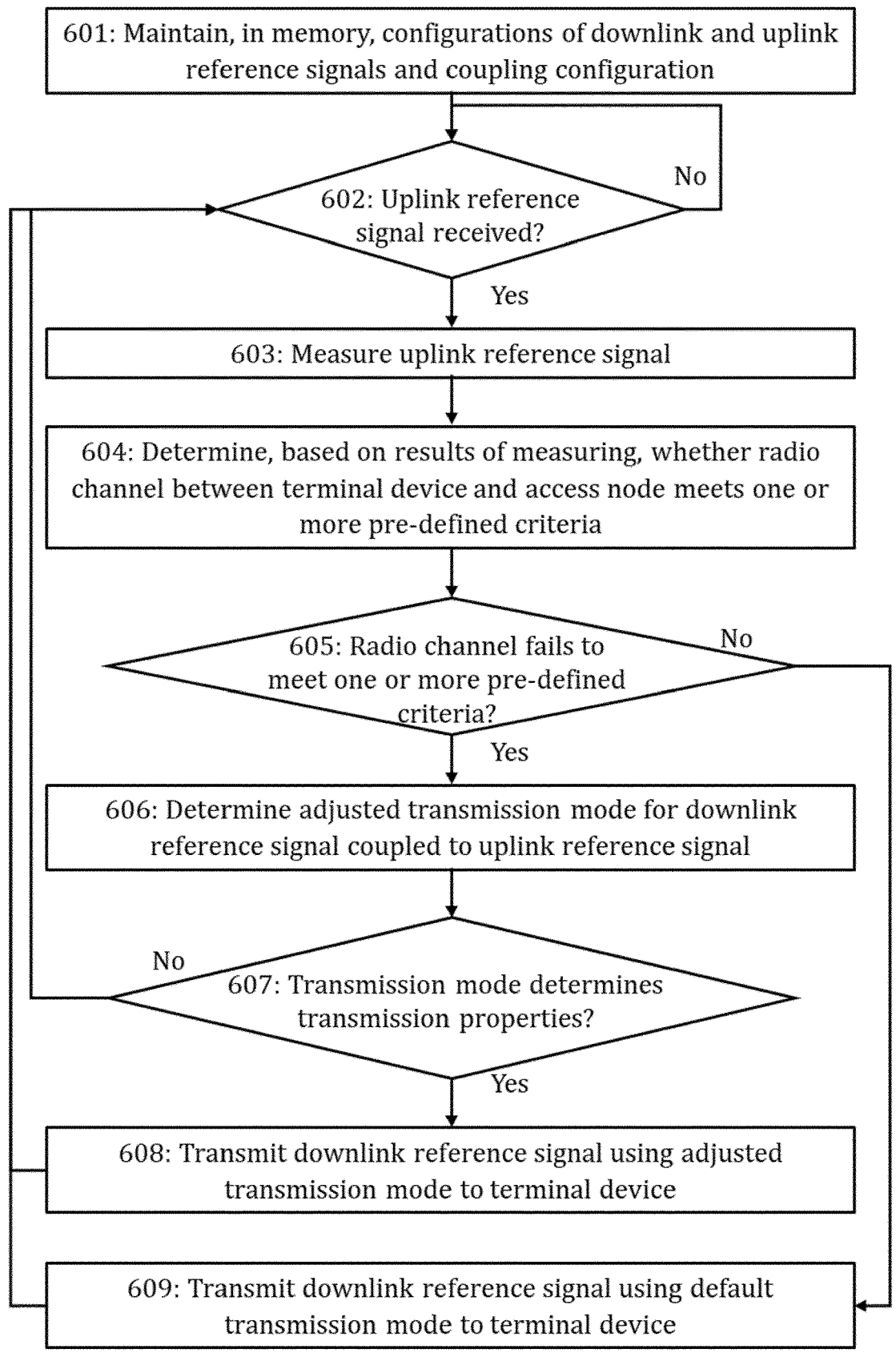

FIG. 6 illustrates a process according to an embodiment for implementing a coupling relationship between a downlink and uplink reference signals for an access node and performing reception/transmission according to said coupling relationship. The illustrated process may form a part of an advanced method for position estimation (e.g., an advanced multi-RTT method). The illustrated process may be performed by an access node or specifically by the access node 104 of FIG. 1. While the illustrated process is performed between the access node and a single terminal device, in other embodiments, corresponding processes may be performed between the access node and a plurality of terminal devices in parallel.

The process of FIG. 6 is, for the most part, analogous with the process of FIG. 2 though some differences do exist (e.g., due to the fact that the access node is still the entity which configures the terminal device, despite of the otherwise reversed roles). Unless otherwise stated, any of the features discussed in relation to FIGS. 2 to 5 may be applied for this reverse scenario in a corresponding manner.

Referring to FIG. 6, the access node initially maintains, in block 601, in a memory of the access node, a configuration of a downlink reference signal for a terminal device, a configuration of an uplink reference signal for a terminal device and a configuration of a coupling relationship between said downlink reference signal and said uplink reference signal. Specifically, the configuration of the coupling relationship may, in this case, define how the access node should act in response to receiving and measuring an uplink reference signal from the terminal device. It is assumed, here, that the terminal device has already been configured according to the configurations of the downlink reference signal and uplink reference signal. This may have been achieved, for example, as discussed in relation to elements 401, 402 of FIG. 4. It should be noted that no configuration of the coupling relationship for the terminal device (e.g., as depicted in elements 403, 404 of FIG. 4) may be needed in this case.

It is assumed that the terminal device which is configured according to the configurations of the downlink and uplink reference signals transmits an uplink reference signal (e.g., an SRS) according to the configuration of the uplink reference signal. The access node receives, in block 602, said uplink reference signal from the terminal device according to the configuration of the uplink reference signal. In response to the receiving, the access node measures, in block 603, the uplink reference signal. The measuring in block 603 may correspond to estimating the uplink channel quality over a certain bandwidth. The measuring in block 603 may comprise, for example, measuring one or more of TOA, RSTD, power or signal strength of the downlink reference signal, a signal-to-noise ratio (SNR) of the downlink reference signal, a signal-to-interference-plus-noise ratio (SINR) of the downlink reference signal. Any of the listed quantities may be measured over certain radio resources.

Subsequently, the access node determines, in block 604, based on results of the measuring, whether a radio channel between the terminal device and the access node meets one or more pre-defined criteria defined, e.g., in the configuration of the coupling relationship. The one or more pre-defined criteria may be defined as described, e.g., in relation to block 206 of FIG. 2. The satisfying of the one or more pre-defined criteria may be indicative of a LOS connection existing between the access node and the terminal device.

In response to determining that the radio channel fails to meet the one or more pre-defined criteria in block 605, the access node determines, in block 606, an adjusted transmission mode for the downlink reference signal coupled to said uplink reference signal based on the configuration of the coupling relationship. The adjusted transmission mode may serve to minimize power consumption (or transmit power) of the access node and thus interference caused by a transmission of the downlink reference signal. The adjusted transmission mode defines, according to the configuration of the coupling relationship, one or more transmission parameters (e.g., transmission power and/or one or more LBT parameters) to be used for transmitting the downlink reference signal (for minimizing power consumption or transmit power of the access node) or that the transmission of the downlink reference signal is to be cancelled.

In response to the adjusted transmission mode defining (or determining) the one or more transmission parameters for transmitting in block 607, the access node transmits, in block 608, the downlink reference signal (e.g., a PRS) to the terminal device using the adjusted transmission mode (i.e., using said one or more transmission parameters).

In response to determining that the radio channel meets the one or more pre-defined criteria in block 605, the access node transmits, in block 609, the downlink reference signal (e.g., the PRS) to the access node using a default transmission mode defined in the configuration of the uplink reference signal and/or in the configuration of the coupling relationship between the downlink reference signal and the uplink reference signal.

The measurement reporting functionalities for enabling terminal device position evaluation, in the LMF, according to a multi-RTT method may be carried out in a similar manner as described above (e.g., in relation to FIG. 2 and elements 509, 510, 513, 514 of FIG. 5). Also, a notification similar to the one discussed in relation to message 410 of FIG. 4 may be employed also in this case (though obviously here the notification is transmitted from the access node to the LMF).

As a summary, the process of FIG. 6 may correspond to a functionality for an on-demand downlink reference signal transmission (e.g., an on-demand PRS transmission) to the terminal device. Specifically, the on-demand downlink reference signal transmission may be, in this case, an on-demand PRS which is multi-RTT specific. In other words, the on-demand PRS is transmitted when the multi-RTT method is decided at the LMF, but under the condition that the one or more pre-defined criteria are met (e.g., a SRS indicative of an existence of a LOS path is detected at the access node).

Figure 7:
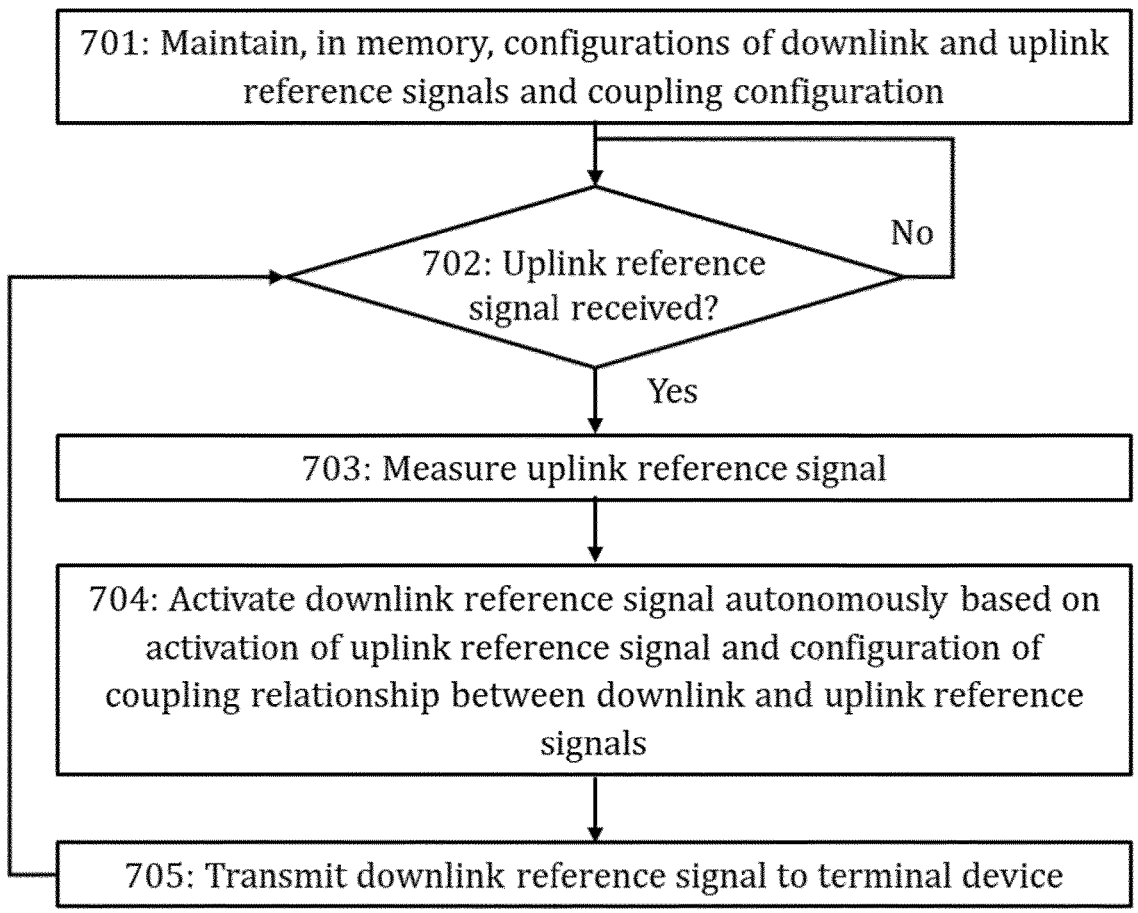

Similar to as discussed in relation to FIG. 5 for the terminal device, the coupling relationship between the downlink and uplink reference signals configured to the access node may be used directly for the activation of a downlink reference signal. FIG. 7 illustrates one such alternative embodiment. The illustrated process may form a part of an advanced method for position estimation (e.g., an advanced multi-RTT method). The illustrated process may be performed by an access node or specifically by the access node 104 of FIG. 1. While the illustrated process is performed between the access node and a single terminal device, in other embodiments, corresponding processes may be performed between the access node and a plurality of terminal devices in parallel.

Referring to FIG. 7, the illustrated process is, for the most part, analogous with the process of FIG. 5 and is, thus, discussed in the following only briefly. Any features discussed in relation to FIG. 5 may be applied in an analogous manner to the process of FIG. 7, unless otherwise stated.

Initially, the access node maintains, in block 701, in a memory of the access node, a configuration of a downlink reference signal for a terminal device, a configuration of an uplink reference signal for the terminal device and a configuration of a coupling relationship between the downlink and uplink reference signals. In response to receiving the uplink reference signal from the access node according to the configuration of the downlink reference signal in block 702, the access node measures, in block 703, the uplink reference signal. The access node activates, in block 704, the downlink reference signal (autonomously) based on an activation of the uplink reference signal defined in the configuration of the uplink reference signal and the configuration of the coupling relationship between the downlink reference signal and the uplink reference signal. Finally, the access node transmits, in block 705, in response to the activating, the downlink reference signal to the terminal device according to the configuration of the downlink reference signal.

The embodiments discussed above enable a terminal device or an access node to reduce the amount of resources needed by transmission of (uplink or downlink) reference signals for multi-RTT positioning methods (or other positioning methods), where the usefulness of transmission of certain reference signals can be inferred by their status or by the measuring the coupled counterpart reference signals in another direction. Hence, the embodiments are beneficial in terms of efficiency improvement.

In some embodiments, the functionalities carried out by the LMF in the above discussion may be carried out by another network node (or specifically by another core network node).

The blocks, related functions, and information exchanges described above by means of FIGS. 2 to 7 are in no absolute chronological order, and some of them may be performed simultaneously or in an order differing from the given one. Other functions can also be executed between them or within them, and other information may be sent, and/or other rules applied. Some of the blocks or part of the blocks or one or more pieces of information can also be left out or replaced by a corresponding block or part of the block or one or more pieces of information.

Figure 8:
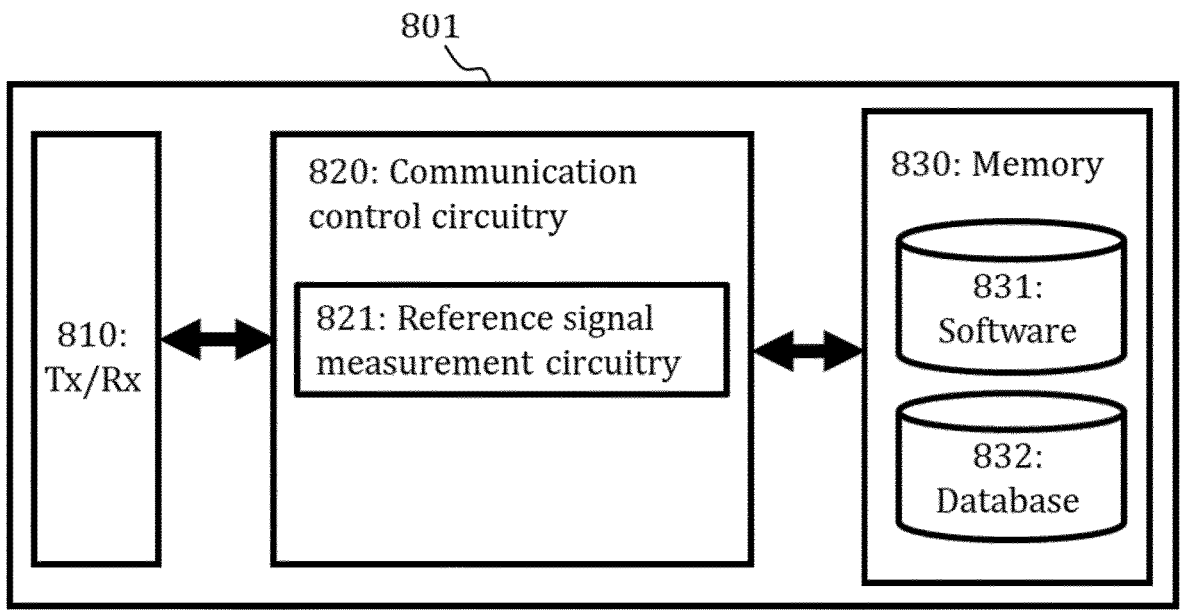
FIGS. 8 and 9 illustrate apparatuses according to embodiments.

FIG. 8 provides a terminal device 801 (apparatus, equipment, UE) according to some embodiments. Specifically, FIG. 8 illustrates a terminal device 801 configured to carry out at least the functions described above in connection with reception, measurement, analysis and transmission of reference signals. The terminal device 801 may comprise one or more communication control circuitry 820, such as at least one processor, and at least one memory 830, including one or more algorithms 831, such as a computer program code (software) wherein the at least one memory and the computer program code (software) are configured, with the at least one processor, to cause the terminal device to carry out any one of the exemplified functionalities of the terminal device described above.

Referring to FIG. 8, the communication control circuitry 820 of the terminal device 801 comprise at least reference signal measurement circuitry 821 which is configured to perform reference signal-related functionalities (e.g., downlink reception, measurement, analysis and/or uplink transmission of reference signals). To this end, the reference signal measurement circuitry 821 is configured to carry out functionalities of the terminal device described above by means of any of FIGS. 1 to 5 using one or more individual circuitries.

Referring to FIG. 8, the memory 830 may be implemented using any suitable data storage technology, such as semiconductor based memory devices, flash memory, magnetic memory devices and systems, optical memory devices and systems, fixed memory and removable memory.

Referring to FIG. 8, the terminal device 801 may further comprise different interfaces 810 such as two or more communication interfaces (TX/RX) comprising hardware and/or software for realizing communication connectivity over the medium according to one or more communication protocols. The communication interface may provide the terminal device 801 with communication capabilities to communicate in the cellular communication system and enable communication between terminal devices and different network nodes or elements (e.g., different access nodes and the LMF), for example. The communication interface may comprise standard well-known components such as an amplifier, filter, frequency-converter, (de) modulator, and encoder/decoder circuitries, controlled by the corresponding controlling units, and one or more antennas. The terminal device 801 may also comprise different user interfaces. In some embodiments, communication interfaces may comprise radio interface components providing the terminal device 801 radio communication capability to use unlicensed bands.

Figure 9:
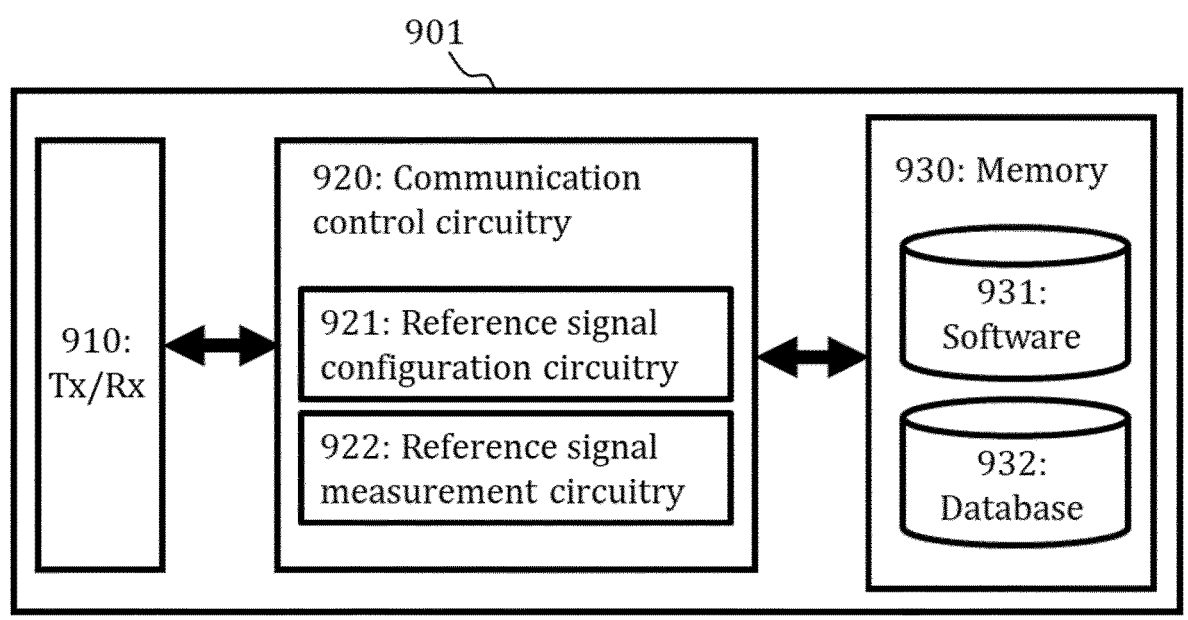

FIG. 9 provides an access node 901 (or a base station) according to some embodiments. Specifically, FIG. 9 illustrates an access node 901 configured to carry out at least the functions described above in connection with receiving and/or transmitting reference signals, configuring one or more terminal devices for receiving and/or transmitting reference signals and/or implementing coupling relationship between downlink and uplink reference signals. The access node 901 may comprise one or more communication control circuitry 920, such as at least one processor, and at least one memory 930, including one or more algorithms 931, such as a computer program code (software) wherein the at least one memory and the computer program code (software) are configured, with the at least one processor, to cause the access node to carry out any one of the exemplified functionalities of the access node described above.

Referring to FIG. 9, the communication control circuitry 920 of the access node 901 comprise at least reference signal configuration circuitry 921 which is configured to configure one or more terminal devices for transmitting and receiving reference signals and reference signal measurement circuitry 922 which is configured to receive, measure, analyze and transmit reference signals. To this end, the reference signal configuration circuitry 921 is configured to carry out functionalities described above by means of any of blocks 301, 302 of FIG. 3, elements 401, 403 of FIG. 4 and elements 501, 503 of FIG. 5. The reference signal configuration circuitry 921 may be specifically configured, using the one or more individual circuitries, to configure one or more terminal devices for carrying out functionalities described above by means of any of FIGS. 1 to 5 for the terminal device. Further, the reference signal measurement circuitry 922 is configured to carry out functionalities described above by means of any of blocks 303 to 306 of FIG. 3, elements 405, 409 of FIG. 4, elements 508, 509, 511 of FIG. 5 and any of elements of FIG. 6 and/or FIG. 7 using one or more individual circuitries.

Referring to FIG. 9, the memory 930 may be implemented using any suitable data storage technology, such as semiconductor based memory devices, flash memory, magnetic memory devices and systems, optical memory devices and systems, fixed memory and removable memory.

Referring to FIG. 9, the access node 901 may further comprise different interfaces 910 such as one or more communication interfaces (TX/RX) comprising hardware and/or software for realizing communication connectivity over the medium according to one or more communication protocols. The communication interface may provide the access node 901 with communication capabilities to communicate in the cellular communication system and enable communication between user devices (terminal devices) and different network nodes or elements and/or a communication interface to enable communication between different network nodes or elements, for example. The communication interface may comprise standard well-known components such as an amplifier, filter, frequency-converter, (de) modulator, and encoder/decoder circuitries, controlled by the corresponding controlling units, and one or more antennas. The communication interfaces may comprise optical interface components providing the base station with optical fiber communication capability. In some embodiments, the communication interfaces may comprise radio interface components providing the access node 901 radio communication capability to provide a cell with at least an unlicensed band.

As used in this application, the term 'circuitry' may refer to one or more or all of the following: (a) hardware-only circuit implementations, such as implementations in only analog and/or digital circuitry, and (b) combinations of hardware circuits and software (and/or firmware), such as (as applicable): (i) a combination of analog and/or digital hardware circuit(s) with software/firmware and (ii) any portions of hardware processor(s) with software, including digital signal processor(s), software, and memory (ies) that work together to cause an apparatus, such as a terminal device or an access node, to perform various functions, and (c) hardware circuit(s) and processor(s), such as a microprocessor(s) or a portion of a microprocessor(s), that requires software (e.g. firmware) for operation, but the software may not be present when it is not needed for operation. This definition of 'circuitry' applies to all uses of this term in this application, including any claims. As a further example, as used in this application, the term 'circuitry' also covers an implementation of merely a hardware circuit or processor (or multiple processors) or a portion of a hardware circuit or processor and its (or their) accompanying software and/or firmware. The term 'circuitry' also covers, for example and if applicable to the particular claim element, a baseband integrated circuit for an access node or a terminal device or other computing or network device.

In an embodiment, at least some of the processes described in connection with FIGS. 2 to 7 may be carried out by an apparatus (e.g., computing device or a computing system) comprising corresponding means for carrying out at least some of the described processes. Some example means for carrying out the processes may include at least one of the following: detector, processor (including dual-core and multiple-core processors), digital signal processor, controller, receiver, transmitter, encoder, decoder, memory, RAM, ROM, software, firmware, display, user interface, display circuitry, user interface circuitry, user interface software, display software, circuit, antenna, antenna circuitry, and circuitry. In an embodiment, the at least one processor, the memory, and the computer program code form processing means or comprises one or more computer program code portions for carrying out one or more operations according to any one of the embodiments of FIG. 2 to 7 or operations thereof.

In embodiments, the at least one processor, the memory, and the computer program code form processing means or comprises one or more computer program code portions for carrying out one or more operations according to any one of the embodiments of FIG. 2 to 7 or operations thereof.

Embodiments as described may also be carried out in the form of a computer process defined by a computer program or portions thereof. Embodiments of the methods described in connection with FIGS. 2 to 7 may be carried out by executing at least one portion of a computer program comprising corresponding instructions. The computer program may be provided as a computer readable medium comprising program instructions stored thereon or as a non-transitory computer readable medium comprising program instructions stored thereon. The computer program may be in source code form, object code form, or in some intermediate form, and it may be stored in some sort of carrier, which may be any entity or device capable of carrying the program. For example, the computer program may be stored on a computer program distribution medium readable by a computer or a processor. The computer program medium may be, for example but not limited to, a record medium, computer memory, read-only memory, electrical carrier signal, telecommunications signal, and software distribution package, for example. The computer program medium may be a non-transitory medium. Coding of software for carrying out the embodiments as shown and described is well within the scope of a person of ordinary skill in the art.

Even though the invention has been described above with reference to examples according to the accompanying drawings, it is clear that the invention is not restricted thereto but can be modified in several ways within the scope of the appended claims. Therefore, all words and expressions should be interpreted broadly and they are intended to illustrate, not to restrict, the embodiment. It will be obvious to a person skilled in the art that, as technology advances, the inventive concept can be implemented in various ways. Further, it is clear to a person skilled in the art that the described embodiments may, but are not required to, be combined with other embodiments in various ways.

The invention claimed is:

1. A terminal device comprising:
   at least one processor; and
   at least one memory including computer program code; the at least one memory and the computer program code configured, with the at least one processor, to cause the terminal device at least to perform:
   maintaining, in the memory, a configuration of a downlink reference signal and a configuration of an uplink reference signal;
   receiving a configuration of a coupling relationship between the downlink reference signal and the uplink reference signal from an access node;
   storing the configuration of the coupling relationship to the memory;
   measuring, in response to receiving the downlink reference signal from the access node according to the configuration of the downlink reference signal, the downlink reference signal;
   determining, based on results of the measuring, whether a radio channel between the terminal device and the access node meets one or more pre-defined criteria;
   in response to determining that the radio channel fails to meet the one or more pre-defined criteria, determining an adjusted transmission mode for the uplink reference signal coupled to the downlink reference signal based on the configuration of the coupling relationship, wherein the adjusted transmission mode determines one or more transmission parameters to be used for transmitting the uplink reference signal or results in a cancellation of a transmission of the uplink reference signal; and
   in response to the adjusted transmission mode determining the one or more transmission parameters, transmitting the uplink reference signal to the access node using the adjusted transmission mode.

2. The terminal device of claim 1, wherein the one or more pre-defined criteria comprise one or more criteria for a line-of-sight, LoS, path existing in the radio channel between the terminal device and the access node.

3. The terminal device of claim 1, wherein the at least one memory and the computer program code are configured, with the at least one processor, to cause the terminal device to perform:
   in response to determining that the radio channel meets the one or more predefined criteria, transmitting the uplink reference signal using a default transmission mode according to the configuration of the uplink reference signal.

4. The terminal device according to claim 1, wherein the at least one memory and the computer program code are configured, with the at least one processor, to cause the terminal device to perform:
   in response to the determining of the adjusted transmission mode, transmitting a notification regarding the adjusted transmission mode to at least one network node.

5. The terminal device according to claim 4, wherein said at least one network node comprises the access node and the notification is transmitted to the access node as an uplink medium access control element, UL MAC CE, or as uplink control information, UCI.

6. The terminal device according to claim 1, wherein the adjusted transmission mode results in the cancellation of the uplink reference signal.

7. The terminal device according to claim 1, wherein the one or more transmission parameters are determined by the adjusted transmission mode and are used for the transmitting of the uplink reference signal.

8. The terminal device according to claim 1, wherein the one or more pre-defined criteria and/or the adjusted transmission mode are defined in the configuration of the coupling relationship.

9. An access node comprising:
- at least one processor; and
- at least one memory including computer program code;
- the at least one memory and the computer program code configured, with the at least one processor, to cause the access node at least to perform:
- maintaining, in the memory, a configuration of a downlink reference signal for a terminal device, a configuration of an uplink reference signal for a terminal device and a configuration of a coupling relationship between the downlink reference signal and the uplink reference signal;
- measuring, in response to receiving the uplink reference signal from the terminal device according to the configuration of the uplink reference signal, the uplink reference signal;
- determining, based on results of the measuring, whether a radio channel between the terminal device and the access node meets one or more pre-defined criteria;
- in response to determining that the radio channel fails to meet the one or more pre-defined criteria, determining an adjusted transmission mode for the downlink reference signal coupled to the uplink reference signal based on results of the measuring, wherein the adjusted transmission mode determines one or more transmission parameters to be used for transmitting the downlink reference signal or results in a cancellation of the transmission of the downlink reference signal; and
- in response to the adjusted transmission mode determining the one or more transmission parameters, transmitting the downlink reference signal to the terminal device using the adjusted transmission mode.

10. The access node of claim 9, wherein the one or more pre-defined criteria is related to a line-of-sight, LoS, path existing in the radio channel between the terminal device and the access node.

11. The access node of claim 9, wherein the at least one memory and the computer program code are configured, with the at least one processor, to cause the access node to perform:
- in response to determining that the radio channel meets the one or more criteria, transmitting the downlink reference signal using a default transmission mode according to the configuration of the uplink reference signal.

12. The access node according to claim 9, wherein the at least one memory and the computer program code are further configured, with the at least one processor, to cause the access node to perform:
- in response to the determining of the adjusted transmission mode, transmitting a notification regarding the adjusted transmission mode to at least one network node.

13. The access node according to claim 12, wherein said at least one network node comprises the terminal device and the notification is transmitted to the terminal device as a downlink medium access control element, DL MAC CE, or as downlink control information, DCI.

14. The access node according to claim 9, wherein the adjusted transmission mode results in the cancellation of the transmission of the downlink reference signal.

15. The access node according to claim 9, wherein the one or more transmission parameters are determined by the adjusted transmission mode and are used for the transmitting of the downlink reference signal.

16. The access node according to claim 9, wherein the one or more pre-defined criteria and/or the adjusted transmission mode are defined in the configuration of the coupling relationship.

17. An access node comprising:
- at least one processor; and
- at least one memory including computer program code;
- the at least one memory and the computer program code configured, with the at least one processor, to cause the access node at least to perform:
- maintaining, in the memory, a configuration of a downlink reference signal for a terminal device, a configuration of an uplink reference signal for the terminal device and a configuration of a coupling relationship between the downlink and uplink reference signals;
- activating, in response to activating the uplink reference signal according to a message received from the terminal device or according to the configuration of the uplink reference signal, the downlink reference signal based on the configuration of the coupling relationship between the downlink reference signal and the uplink reference signal; and
- transmitting, in response to the activating, the downlink reference signal to the terminal device according to the configuration of the downlink reference signal.

* * * * *